United States Patent
Weyland

(10) Patent No.: US 8,200,371 B2
(45) Date of Patent: Jun. 12, 2012

(54) PREDICTION ENGINE TO CONTROL ENERGY CONSUMPTION

(75) Inventor: Sebastien Weyland, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 12/491,492

(22) Filed: Jun. 25, 2009

(65) Prior Publication Data

US 2010/0332043 A1 Dec. 30, 2010

(51) Int. Cl.
G05D 3/12 (2006.01)
G06F 1/32 (2006.01)

(52) U.S. Cl. ......................... 700/291; 713/320

(58) Field of Classification Search .................. 700/291; 713/320, 321, 323, 324
See application file for complete search history.

(56) References Cited

U.S. PATENT DOCUMENTS

| | | | |
|---|---|---|---|
| 4,910,574 A | 3/1990 | Aipperspach et al. | |
| 5,504,908 A | 4/1996 | Ikeda | |
| 5,566,340 A | 10/1996 | Stewart et al. | |
| 5,799,256 A | 8/1998 | Pombo et al. | |
| 6,654,895 B1 | 11/2003 | Henkhaus | |
| 7,134,028 B2 | 11/2006 | Bose et al. | |
| 7,222,244 B2 | 5/2007 | Kawahara et al. | |
| 7,279,926 B2 | 10/2007 | Severson et al. | |
| 2003/0061091 A1* | 3/2003 | Amaratunga et al. | 705/10 |
| 2006/0184287 A1 | 8/2006 | Belady | |
| 2006/0288241 A1 | 12/2006 | Felter | |
| 2008/0005381 A1 | 1/2008 | Theocharous et al. | |
| 2008/0126282 A1* | 5/2008 | Sinclair et al. | 706/21 |
| 2009/0006875 A1 | 1/2009 | Varma | |
| 2009/0031156 A1 | 1/2009 | Barth | |

FOREIGN PATENT DOCUMENTS

| | | |
|---|---|---|
| EP | 1271291 | 1/2003 |
| EP | 1271291 A2 * | 1/2003 |

OTHER PUBLICATIONS

International Search Report—PCT/US2010/040072, International Search Authority—European Patent Office (Sep. 9, 2010).*
International Search Report—PCT/US2010/040072, International Search Authority—European Patent Office Sep. 9, 2010.
Hwang, Young-Si, et al. "Predictive Power Aware Management for Embedded Mobile Devices," Design Automation Conference, ASPDAC 2008, Asia and South Pacific, Mar. 21-24, 2008, pp. 36-41.
Written Opinion—PCT/US2010/040072—International Search Authority European Patent Office—Sep. 9, 2010.

* cited by examiner

*Primary Examiner* — Ryan Jarrett
(74) *Attorney, Agent, or Firm* — Sam Talpalatsky; Nicholas J. Pauley; Jonathan T. Velasco

(57) ABSTRACT

In a particular embodiment, an apparatus is disclosed that includes at least one controllable energy consuming module and a prediction engine. The prediction engine includes detection logic configured to determine a historical usage pattern of the at least one controllable energy consuming module, prediction logic configured to create a prediction rule that predicts future usage of the at least one controllable energy consuming module based on the historical usage pattern, control logic configured to selectively control an energy level of the at least one controllable energy consuming module based on the prediction rule, and learning logic configured to update the prediction logic in response to detecting usage of the at least one controllable energy consuming module in a manner that differs from the usage predicted by the prediction rule.

46 Claims, 8 Drawing Sheets

PREDICTION ENGINE TO CONTROL ENERGY CONSUMPTION

I. FIELD

The present disclosure is generally related to a prediction engine to control energy consumption in electronic devices.

II. DESCRIPTION OF RELATED ART

Energy consumption is a performance factor for many computing systems. Mobile computing systems, such as laptop computers, notebook computers, and handheld devices (e.g., personal digital assistants, cell phones, etc.) that are battery powered often incorporate power management features. For example, to conserve battery power, many mobile devices enter a low power (e.g., "Sleep," "Stand-by," or "Hibernate") state during periods of inactivity. In this case, entering a low power state may involve reducing power to the mobile device when all of the individual modules of the mobile device are inactive. In many instances, only a few individual modules of the system are active while the remainder of the modules in the system are inactive. For example, usage of a specific application may result in some individual modules in the system being consistently inactive while others are active.

III. SUMMARY

A prediction engine may be incorporated into a computing system to control energy levels of individual modules of the computing system. The prediction engine may control an energy level of an individual module by identifying a historical usage pattern of the individual module. Based on the historical usage pattern, the prediction engine may predict a future usage of the individual module. In response to detecting the historical usage pattern, the prediction engine may change the energy level of the individual module. The prediction engine may update the predicted future usage based on measured usage of the individual module.

In a particular embodiment, an apparatus is disclosed that includes at least one controllable energy consuming module and a prediction engine. The prediction engine includes detection logic, prediction logic, control logic, and learning logic. The detection logic is configured to determine a historical usage pattern of the at least one controllable energy consuming module. The prediction logic is configured to create a prediction rule that predicts a future usage of the at least one controllable energy consuming module based on the historical usage pattern. The control logic is configured to selectively control an energy level of the at least one controllable energy consuming module based on the prediction rule. The learning logic is configured to update the prediction logic in response to detecting usage of the at least one controllable energy consuming module in a manner that differs from the predicted usage.

In another particular embodiment, an apparatus includes means for determining a historical usage pattern of at least one controllable energy consuming module. The apparatus also includes means for creating a prediction rule that predicts future usage of the at least one controllable energy consuming module based on the historical usage pattern. The apparatus also includes means for selectively controlling an energy level of the at least one controllable energy consuming module based on the prediction rule. The apparatus includes means for updating the prediction rule in response to detecting usage of the at least one controllable energy consuming module in a manner that differs from the usage predicted by the prediction rule.

In another particular embodiment, a method is disclosed that includes identifying a historical usage pattern by monitoring usage of at least one controllable energy consuming module during a first monitoring operation. The method also includes creating a prediction rule that predicts a future usage of the at least one controllable energy consuming module based on the historical usage pattern. The method also includes changing an energy level of the at least one controllable energy consuming module based on the prediction rule in response to detecting the historical usage pattern during a second monitoring operation. The method also includes updating the prediction rule based on a determination of whether the at least one controllable energy consuming module was used during a third monitoring operation.

One particular advantage provided by at least one of the disclosed embodiments is to control an energy level of an individual module of a computing system using a prediction rule based on historical usage of the individual module. Controlling energy levels of one or more individual modules may enable the computing system to conserve energy by only powering modules that are being used. Another particular advantage provided by at least one of the disclosed embodiments is that the computing system can update the prediction rule based on actual usage of the module after applying controls to the module. Updating the prediction rule enables the computing system to learn from use. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
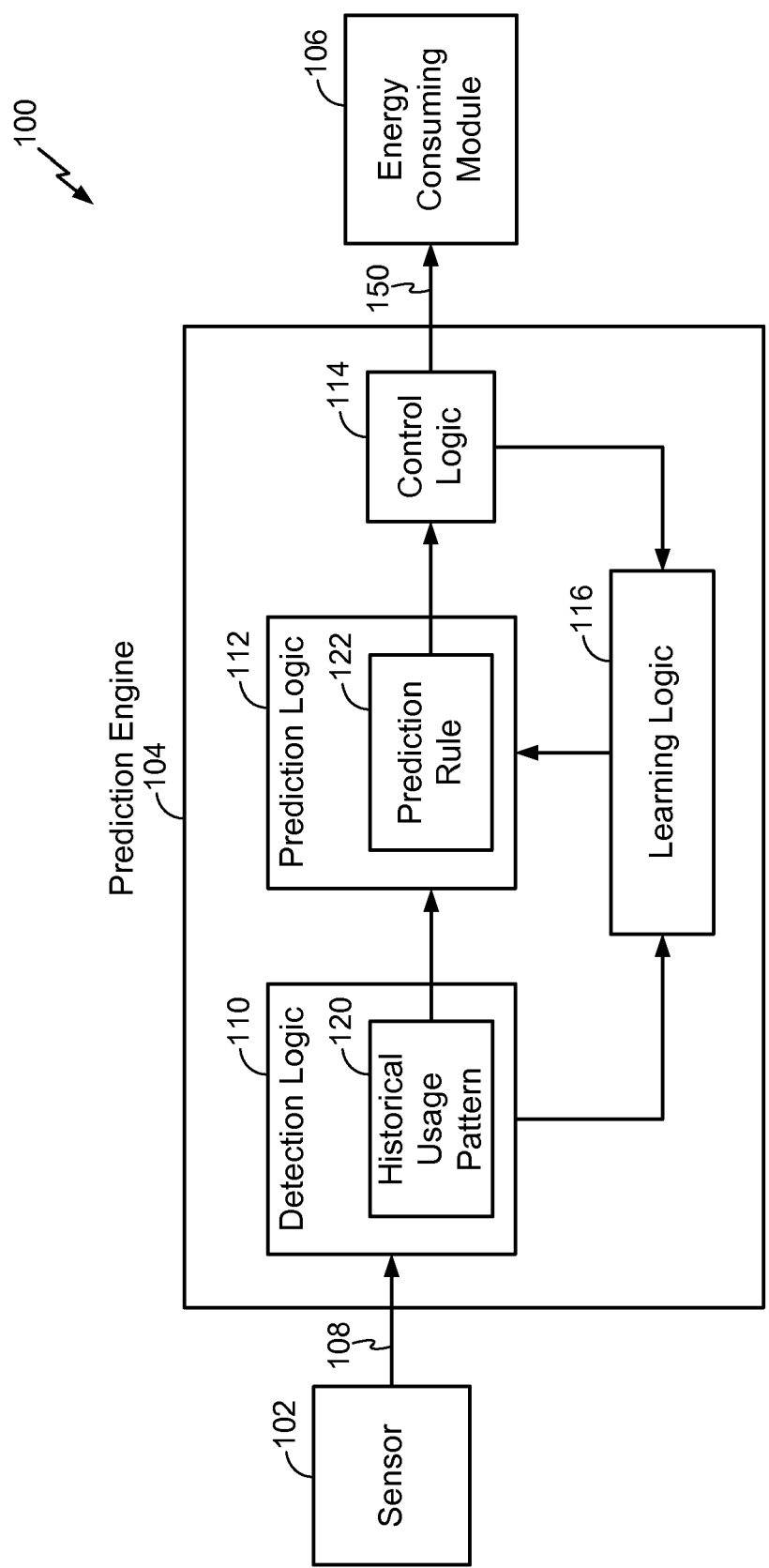
FIG. 1 is a block diagram of a first illustrative embodiment of an apparatus that includes a prediction engine.

Referring to FIG. 1, an illustrative apparatus 100 is shown. The apparatus 100 includes a sensor 102, a prediction engine 104, and an energy consuming module 106. The prediction engine 104 includes detection logic 110, prediction logic 112, control logic 114, and learning logic 116. The detection logic 110 includes a historical usage pattern 120, and the prediction logic 112 includes a prediction rule 122.

Generally, the apparatus 100 may be an electronic device, such as a mobile device, and the energy consuming module 106 may be an individual module of the mobile device, such as a display adapter. The prediction engine 104 may control energy usage of the individual modules of the mobile device based on predictions. The predictions may be updated based on actual usage of the individual modules. By updating the predictions, future predictions may be improved, allowing the mobile device to more accurately control energy consumption of the individual modules, such as the display adapter.

The prediction engine 104 may receive sensed data 108 from the sensor 102. Although FIG. 1 illustrates the prediction engine 104 as receiving sensed data 108 from the sensor 102, the prediction engine 104 may receive data from a connection to a bus. The prediction engine 104 provides an output, such as a control signal 150 that controls the energy consuming module 106. In a particular embodiment, the detection logic 110 is configured to determine the historical usage pattern 120 of at least one controllable energy consuming module, such as the illustrated energy consuming module 106. While only a single energy consuming module 106 is shown, the control logic 114 may provide control signals to a plurality of different energy consuming modules. The detection logic 110 may send the historical usage pattern 120 to the prediction logic 112. In a particular embodiment, the prediction logic 112 is configured to create the prediction rule 122 that predicts a future usage of the energy consuming module 106 based on the historical usage pattern 120 and the sensed data 108. The prediction rule 122 may be used by the control logic 114 to generate the control signal 150 that is used to adjust energy consumption in the energy consuming module 106. The prediction logic 112 may be configured to transmit the prediction rule 122 to the control logic 114.

Further, the control logic 114 may be configured to selectively control an energy level of the at least one controllable energy consuming module (e.g., the energy consuming module 106) based on the prediction rule 122 received from the prediction logic 112. For example, the control logic 114 may be configured to control the energy level of the energy consuming module 106 by varying the control signal 150 based on the prediction rule 122.

The learning logic 116 may receive a first set of signals from the detection logic 110 and a second set of signals from the control logic 114. The learning logic 116 may provide a feedback signal to the prediction logic 112. In a particular embodiment, the learning logic 116 is configured to update the prediction logic 112 in response to detecting usage of the at least one controllable energy consuming module (e.g., energy consuming module 106) in a manner that differs from the future usage predicted by the prediction rule 122. In a particular embodiment, the identification of the historical usage pattern 120, the creation of the prediction rule 122, the change of the energy level of the at least one controllable energy consuming module, and the update of the prediction rule 122 are performed at a processor integrated into an electronic device.

During operation, the sensed data 108 may be provided by the sensor 102 and may be received at an input of the prediction engine 104. In a particular embodiment, the sensor 102 includes one of several different types of sensors, such as a motion sensor, a current sensor, a voltage sensor, an accelerometer, or another electronic device sensor. Alternatively, the sensor 102 may include part of an integrated circuit, such as a portion of a logic module or interconnection within the integrated circuit. The sensed data 108 may be received by the detection logic 110 within the prediction engine 104. In a particular embodiment, the detection logic 110 determines the historical usage pattern 120 based on the sensed data 108. The detection logic 110 may save data related to the historical usage pattern 120 so that the historical usage pattern 120 is detectable when the historical usage pattern 120 subsequently occurs. The detection logic 110 may provide the historical usage pattern 120 to the prediction logic 112. Based on the received historical usage pattern 120, the prediction logic 112 may create the prediction rule 122 that predicts future usage of the at least one controllable energy consuming module (e.g., energy consuming module 106). In a particular embodiment, the prediction logic 112 also receives the feedback signal from the learning logic 116. In this case, the prediction logic 112 creates the prediction rule 122 based on the historical usage pattern 120 from the detection logic 110 as adjusted based on the feedback signal received from the learning logic 116. Using the historical usage pattern 120 from the detection logic 110 and the feedback signal from the learning logic 116, the prediction logic 112 may continually enhance the prediction rule 122 which is provided to the control logic 114.

In a particular embodiment, the detection logic 110 compares the sensed data 108 to the historical usage pattern 120 and identifies whether the sensed data 108 matches the historical usage pattern 120. When a match is detected, the detection logic 110 may provide the matched historical usage pattern (e.g., the historical usage pattern 120) to the prediction logic 112. After the prediction logic 112 receives the historical usage pattern 120, the prediction logic 112 may transmit a matched prediction rule (e.g., the prediction rule 122) that is based on the matched historical usage pattern (e.g., the historical usage pattern 120) to the control logic 114. The control logic 114 may control the energy consuming module 106 based on the matched prediction rule (e.g., the prediction rule 122). For example, the control logic 114 may cause the energy consuming module 106 to enter into a low power consuming "sleep mode" based on the matched prediction rule. As another example, the control logic 114 may cause the energy consuming module 106 to "wake up" from such a "sleep mode."

The control logic 114 may selectively control an energy level of a downstream module, such as the energy consuming module 106, with the control signal 150. While only a single energy consuming module 106 is shown, the control logic 114 may provide control signals to a plurality of different energy consuming modules. In a particular embodiment, the control logic 114 is responsive to the prediction logic 112. After receiving the prediction rule 122, the control logic 114 sends the control signal 150 to the energy consuming module 106. In this manner, the control logic 114 may actively and selectively control the energy level of the energy consuming module 106.

In a particular embodiment, the control logic 114 saves the state information of the at least one controllable energy consuming module before changing the energy level of the at least one controllable energy consuming module. The state information of the at least one controllable energy consuming module may include the energy levels of individual components of the at least one controllable energy consuming module. The saved state information may be transmitted to the learning logic 116 as part of the second set of signals. The learning logic 116 may use the saved state information to update the prediction logic 112. For example, the prediction logic 112 may be updated based on the saved state information indicating that the at least one controllable energy consuming module had a low energy level at a particular time before the control signal 150 was sent.

In a particular embodiment, the control logic 114 controls the energy level of the at least one controllable energy consuming module by sending a reduce power control signal to the at least one controllable energy consuming module, such as the illustrated energy consuming module 106. In an alternative embodiment, the control logic 114 sends a "stop" signal or similar signal that stops energy usage at a component or an entire module, such as a component or the entire module 106. Alternatively, the energy level may be changed by sending a wake-up control signal to the at least one controllable energy consuming module before a time indicated by the prediction rule 122 that the at least one controllable energy consuming module will be used.

The learning logic 116 may provide the feedback to the prediction logic 112 based on the first set of signals received from the detection logic 110 and the second set of signals received from the control logic 114. In a particular embodiment, the control logic 114 sends the second set of signals to the learning logic 116 after the control logic 114 has sent a reduce power control signal. In this manner, the learning logic 116 may provide the feedback signal to the prediction logic 112 in response to detecting transmission of the reduce power control signal. Alternatively, the control logic 114 may send the second set of signals to the learning logic 116 after the wake-up control signal was sent. In a particular embodiment, the prediction logic 112 updates the prediction rule 122 in response to receiving the update from the learning logic 116. The prediction logic 112 may update the prediction rule 122 in response to receiving the update from the learning logic 116. For example, the prediction logic 112 may update the prediction rule 122 based on the feedback signal after the control logic 114 has sent the reduce power signal to the energy consuming module 106.

In a particular embodiment, the learning logic 116 receives the first set of signals from the detection logic 110. The detection logic 110 may send the first set of signals in response to detecting the usage of the at least one controllable energy consuming module. The learning logic 116 may determine that the usage of the at least one controllable energy consuming module occurred after the wake-up control signal was sent. In a particular embodiment, the prediction logic 112 is updated in response to the detection logic 110 detecting the usage of the at least one controllable energy consuming module after the wake-up control signal is sent. For example, the learning logic 116 may determine that the usage of the at least one controllable energy consuming module did not occur in a manner predicted based on the information received from the second set of signals.

In a particular embodiment, detecting the usage of the at least one controllable energy consuming module in a manner that differs from the predicted future usage comprises detecting usage of the at least one controllable energy consuming module during a time period where the prediction rule indicates that the at least one controllable energy consuming module will not be used during the time period. In response to detecting usage of the at least one controllable energy consuming module in a manner that differs from the predicted future usage, the learning logic 116 may update the prediction logic 112.

Detecting the usage of the at least one controllable energy consuming module in a manner that differs from the predicted future usage may comprise measuring a wake-up delay. In a particular embodiment, the wake-up delay comprises a calculation of a difference in time between a time of the wake-up control signal and a time of usage of the at least one controllable energy consuming module. The second set of signals received from the control logic 114 may indicate the time that the wake-up control signal was sent and the first set of signals received from the detection logic 110 may indicate the time of usage of the at least one controllable energy consuming module. For example, the learning logic 116 may calculate that there is a two hour time gap between a wake-up control signal sent at 6:00 am and usage of the at least one controllable energy consuming module occurring at 8:00 am. The learning logic 116 may update the prediction logic 112 based on the measured wake-up delay. In this case, the prediction rule 122 may be updated based on the measured wake-up delay. By updating the prediction rule 122 based on the measured wake-up delay, the prediction logic 112 can provide enhanced and improved prediction rules that more accurately predict future usage. Increasing the accuracy of the future predictions may increase the energy efficiency of the energy consuming module 106.

In a particular embodiment, detecting the usage of the at least one controllable energy consuming module in a manner that differs from the predicted future usage may comprise measuring an error in response to the prediction rule 122 predicting the at least one controllable energy consuming module will not be used and a detected usage occurs within a threshold time period. The measurement of the error may include calculating a difference between a time the future usage was predicted to occur and the time the usage of the at least one controllable energy consuming module occurred. For example, the learning logic 116 may use the first set of signals received from the detection logic 110 indicating the time when the at least one controllable energy consuming module was used. The learning logic 116 may update the prediction logic 112 based on the measured error. In this case, the prediction rule 122 may be updated based on the measured error.

In a particular embodiment, the prediction engine 104 may provide the learning logic 116 with the second set of signals so that the learning logic 116 can improve the prediction of the future usage of the energy consuming module 106 by updating the prediction logic 112. The prediction logic 112 can provide enhanced and improved prediction rules that evolve and adapt to a specific energy consuming module environment. In this manner, the prediction engine 104 may be an intelligent engine that adapts to its environment, adapts to sensing input, and provides dynamically adjusted prediction rules to control energy levels of energy consuming devices or components.

In addition, the prediction engine 104 may be used to control energy levels of a plurality of energy consuming modules. In a particular embodiment, the historical usage pattern 120 includes historical usage data of the at least one controllable energy consuming module. The historical usage data of the at least one controllable energy consuming module may be based on an output from the at least one controllable energy consuming module. In addition, the historical usage pattern 120 may be a static pattern such as a stored pattern resulting from historical pattern usage tracked from prior detection or may be dynamically supplied patterns such as patterns evolving from real-time detection scenarios. For example, usage of the energy consuming module 106 may occur in response to the prediction engine 104 controlling the energy level of the energy consuming module 106.

Figure 2:
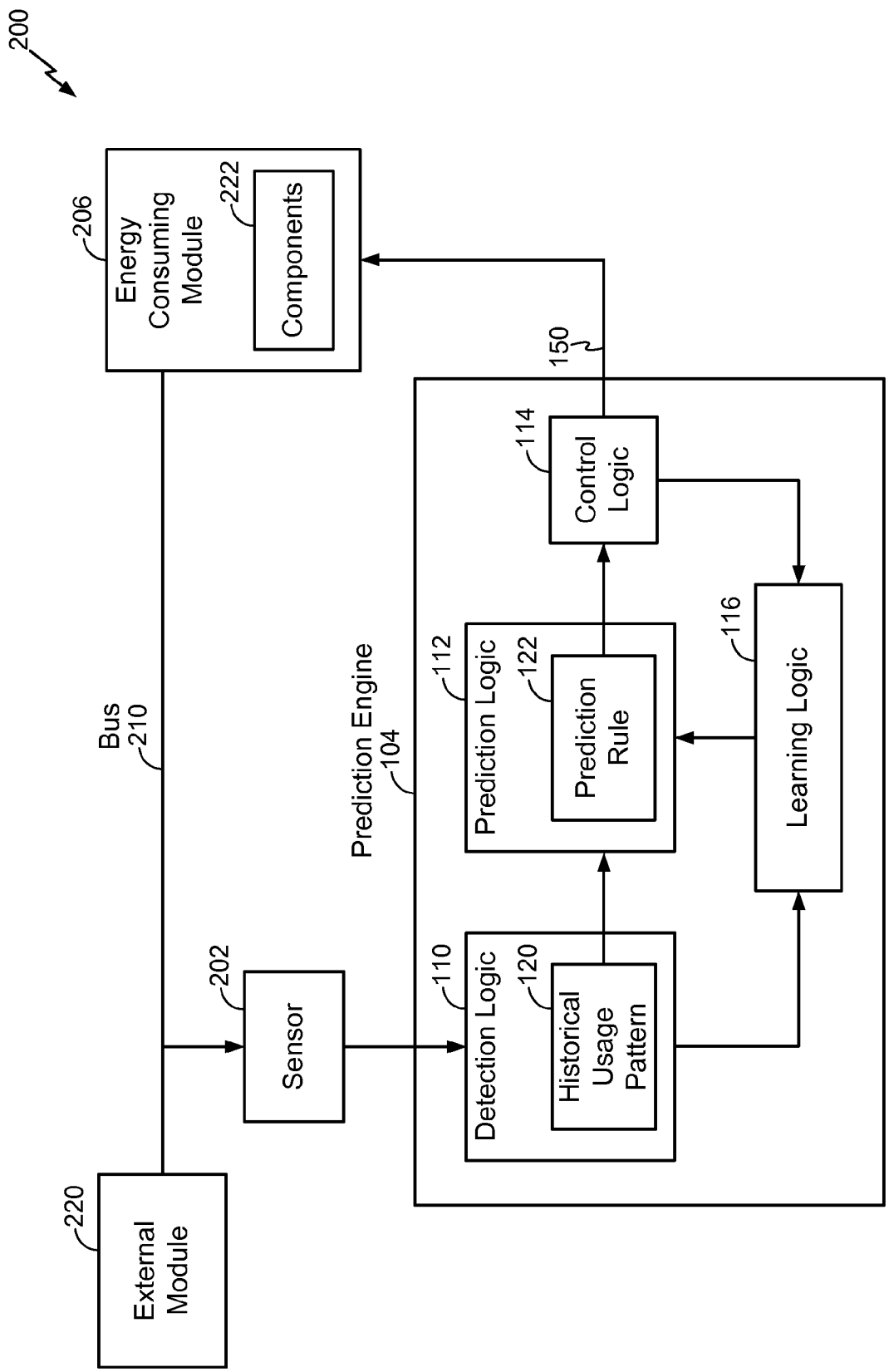
FIG. 2 is a block diagram of a second illustrative embodiment of an apparatus that includes a prediction engine.

Referring to FIG. 2, an illustrative apparatus 200 is illustrated. The apparatus 200 includes many elements found in the apparatus 100 referred to in FIG. 1, where similar elements have the same reference number. The apparatus 200 includes an external module 220, a bus 210, and an energy consuming module 206. The bus 210 couples the external module 220 to the energy consuming module 206. The apparatus 200 also includes a sensor 202 that is coupled to receive information from the bus 210. Although FIG. 2 illustrates the prediction engine 104 as receiving input from the sensor 202, the prediction engine 104 may receive data directly from a connection to the bus 210. The sensor 202 is further coupled to the prediction engine 104. The prediction engine 104 includes the same components as described and operates as described with respect to FIG. 1. The bus 210 may be a data bus, an address bus, a control bus, a communication bus, or any combination thereof. The sensor 202 may be configured to sense and to detect transmissions that occur over the bus 210. In a particular embodiment, the sensor 202 includes a plurality of inputs where each of the inputs is tied to a distinct line or path of the bus 210. The sensor 202 may be configured to detect transmissions on each communication path of the bus 210.

During operation, the external module 220 may communicate with the energy consuming module 206 via the bus 210. For example, the external module 220 may be a master device that communicates with the energy consuming module 206 in a slave mode via the bus 210. The sensor 202 may monitor the bus 210 and detect transmissions and signals carried over the bus 210. The monitored transmissions and signals may be provided by the sensor 202 as an input to the prediction engine 104. The prediction engine 104, in turn, may identify the historical usage pattern 120 and create the prediction rule 122 based on the historical usage pattern 120. The prediction rule 122 may be provided to the control logic 114. In response to receiving the prediction rule 122, the control logic 114 may apply the control signal 150 to control an energy level of one or more components 222 of the energy consuming module 206. In a particular embodiment, the prediction engine 104 provides an enhanced energy control mechanism by providing the control signal 150 based on feedback signals from the learning logic 116. In a particular embodiment, the historical usage pattern 120 is generated by the prediction engine 104 in response to an output from at least one external module (e.g., the external module 220) of a plurality of external modules. In a particular embodiment, the historical usage pattern 120 includes at least one historical usage data of at least one energy consuming module of the plurality of external modules. The at least one historical usage data may be determined based on the output from the at least one energy consuming module. For example, an output of the external module 220, such as an output over the bus 210, may be monitored by a sensor 202. The output may be used by the prediction engine 104 to identify an appropriate historical usage pattern (e.g., the historical usage pattern 120) and to create a particular prediction rule (e.g., the prediction rule 122) that results in a particular control signal (e.g., the control signal 150) being sent to the energy consuming module 206. In a particular embodiment, the prediction rule 122 is a sleep rule or a wakeup rule that determines when the control signal 150 is a sleep signal or a wakeup signal.

It should be noted that although the particular apparatus illustrated in FIG. 2 includes multiple logical units, engines, and modules, the apparatus of FIG. 2 may exist within a single electronic device. Multiple external modules may provide input to the sensor 202. Sensed data that includes input from multiple external modules may allow the prediction engine to create enhanced prediction rules that more accurately predict future usage of the energy consuming module 206. For example, the sensor 202 may receive an output of a motion sensor and may generate sensed data that the prediction engine 104 uses to predict usage of the energy consuming module 206. As another example, the prediction engine 104 may generate a prediction rule 122 based on sensed data that is based on an output of the motion sensor indicating a rapid increase in altitude, such as on take-off in an airplane.

Figure 3:
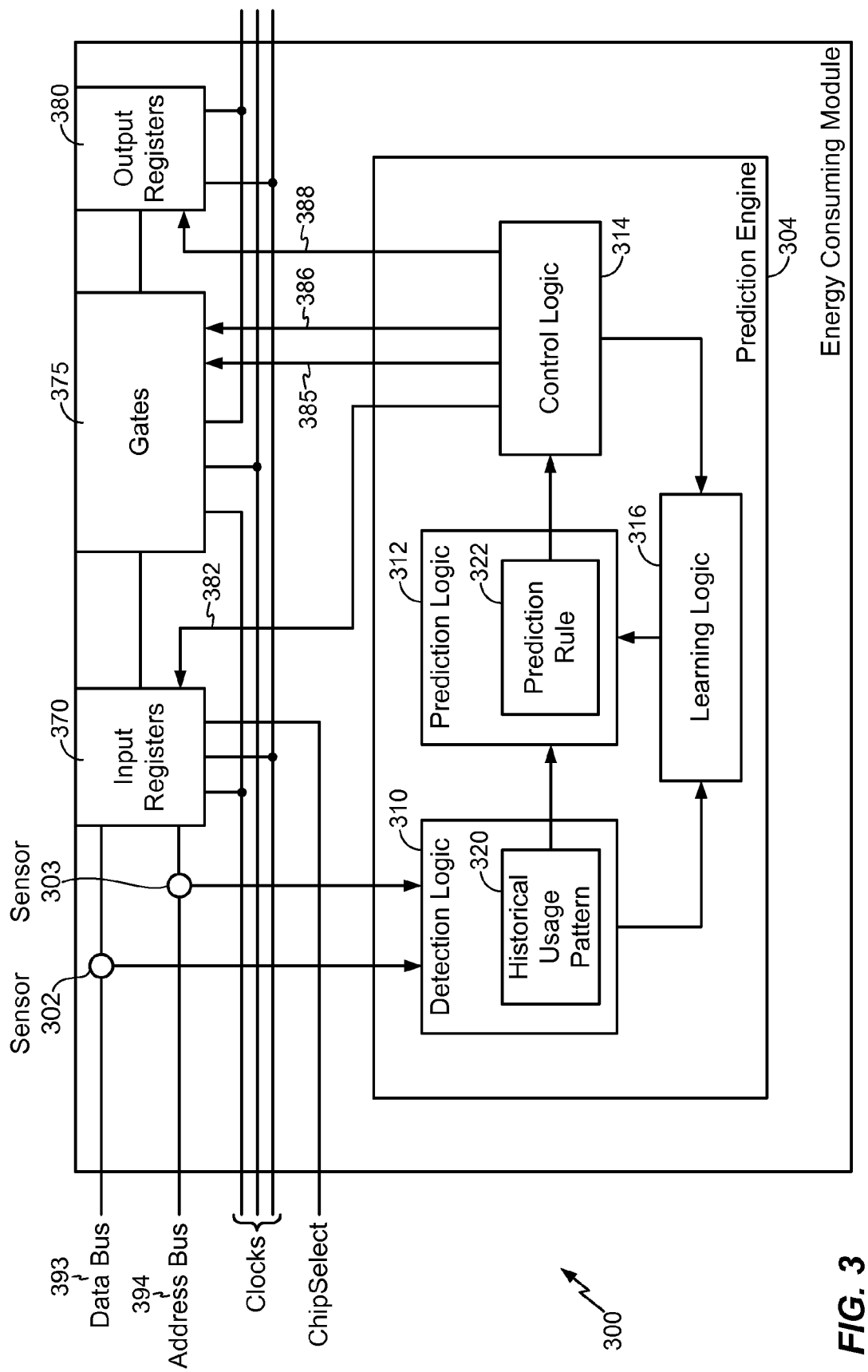
FIG. 3 is a block diagram of an illustrative embodiment of an energy consuming module that includes a prediction engine.

Referring to FIG. 3, an illustrated embodiment of an energy consuming module 300 that contains a prediction engine 304 is disclosed. In addition to the prediction engine 304, the energy consuming module 300 also includes sensors (e.g., a data bus sensor 302, an address bus sensor 303), input registers 370, gates 375, and output registers 380. The prediction engine 304 includes detection logic 310, prediction logic 312, control logic 314, and learning logic 316.

The prediction engine 304 may receive sensed data from the data bus sensor 302 and the address bus sensor 303. In a particular embodiment, the prediction engine 304 provides output as control signals, such as an input register voltage control signal 382, a gate voltage control signal 385, a gate clear control signal 386, and an output register voltage control signal 388.

In a particular embodiment, the detection logic 310 is configured to determine a historical usage pattern 320 of at least one controllable energy consuming module, such as the illustrated energy consuming module 300. The prediction logic 312 may be configured to create a prediction rule 322 that predicts a future usage of the energy consuming module 300 based on the historical usage pattern 320 received from the detection logic 310. The control logic 314 may be configured to selectively control an energy level of the energy consuming module 300 based on the prediction rule 322. In a particular embodiment, the control logic 314 is configured to control energy levels of individual components within the energy consuming module 300. For example, the control logic 314 may control an energy level of the input registers 370 by providing the input register voltage control signal 382 to the input registers 370. In another embodiment, an energy level of the gates 375 may be controlled by the gate voltage control signal 385. As another example, control of an energy level of the output registers 380 may be accomplished by the control logic 314 sending the output register voltage control signal 386 to the output registers 380.

In another embodiment, the control logic 314 is responsive to the prediction logic 312 and receives the prediction rule 322 from the prediction logic 312. The learning logic 316 may be configured to receive a first set of signals from the detection logic 310 and receive a second set of signals from the control logic 314. In a particular embodiment, the learning logic 316 provides a feedback signal to the prediction logic 312. The learning logic 316 may be configured to update the prediction logic 312 in response to detecting usage of the energy consuming module 300 in a manner that differs from the future usage predicted by the prediction rule 322. For example, the learning logic 316 may update the prediction logic 312 via the feedback signal in response to determining that a particular usage scenario of the energy consuming module 300 that was predicted to be a low energy consumption scenario was in fact a high energy consumption scenario. For example, the prediction engine 304 reduced the energy level of the energy consuming module 300 based on a prediction that the energy consuming module 300 would not be used during the hours of 1:00 am to 6:00 am. In this case, the prediction engine 304 may update the prediction rule when the energy consuming module 300 is used at 3:00 am. In a particular embodiment, the learning logic 316 includes one or more neural networks.

During operation, the data bus sensor 302 and the address bus sensor 303 may provide the sensed data to the prediction engine 304. The sensed data may be received by the detection logic 310 within the prediction engine 304. In a particular embodiment, the detection logic 310 may determine the historical usage pattern 320 based on the sensed data. The detection logic 310 may provide the historical usage pattern 320 to the prediction logic 312. Based on the received historical usage pattern 320, the prediction logic 312 may create the prediction rule 322 that predicts the future usage of the energy consuming module 300. In a particular embodiment, the prediction logic 312 also receives the feedback signal from the learning logic 316. In this case, the prediction logic 312 may create the prediction rule 322 based on the historical usage pattern 320 from the detection logic 310 and based on the feedback signal from the learning logic 316.

In a particular embodiment, the detection logic 310 determines whether the sensed data matches the historical usage pattern 320. In response to detecting a match, the detection logic 310 may provide the matched historical usage pattern (e.g., the historical usage pattern 320) to the prediction logic 312. After the prediction logic 312 receives the matched historical usage pattern (e.g., the historical usage pattern 320), the prediction logic 312 may transmit a matched prediction rule (e.g., the prediction rule 322) that is based on the matched historical usage pattern to the control logic 314.

The control logic 314 may selectively control the energy levels of individual components of the energy consuming module 300, such as the input register 370, the gates 375, and the output registers 380. In a particular embodiment, the control logic 314 is responsive to the prediction logic 312 and after receiving the prediction rule 322 from the prediction logic 312, the control logic 314 sends one or more control signals to the individual components of the energy consuming module 300. In a particular embodiment, the control logic 312 controls the energy level of the individual components by sending a reduced power control signal to the individual components of the energy consuming module 300. For example, the control logic 314 may reduce the energy level of the input registers 370 by sending a reduce power control signal via the input registers voltage control signal 382. Reducing the energy level of the input registers 370 allows the energy consuming module 300 to reduce the energy level of individual components which reduces the overall energy consumption of the energy consuming module 300.

In an alternative embodiment, the control logic 314 may send a "stop" signal or similar signal that stops energy usage or turns off energy at a component of the energy consuming module. For example, the control logic 314 may turn off the energy of the gates 375 by sending a stop signal via the gates voltage control signal 385. Controlling the energy level of individual components allows the energy consuming module 300 to reduce the overall energy consumption of the energy consuming module 300. In addition, the control logic 314 may send a signal to wake-up a sleeping component or turn on a disabled component. For example, the control logic 314 may wake-up the output registers 380 by sending the wake-up signal via the output registers voltage control signal 386. In a particular embodiment, the stop signal and the wake-up signal are sent in response to sensed data from the data bus sensor 302, sensed data from the address bus sensor 303, one or more prediction rules, or any combination thereof.

The learning logic 316 may provide the feedback signal to the prediction logic 312 based on the first set of signals received from the detection logic 310 and the second set of signals received from the control logic 314. The learning logic 316 may receive the first set of signals from the detection logic 310. The detection logic 310 may send the first set of signals in response to detecting the usage of one of the individual modules of the at least one controllable energy consuming components (e.g., the input registers 370, the gates 375, and the output registers 380). The detection logic 310 may detect the usage of the individual components based on the sensed data received from the sensors (e.g., the data bus sensor 302 and the address bus sensor 303). In a particular embodiment, information transmitted on the data bus 393 and address bus 394 may indicate the usage of the individual components of the at least one controllable energy consuming module.

In a particular embodiment, the control logic sends the second set of signals to the learning logic 316 after the control logic 314 sends at least one of the control signals (e.g., the input register voltage control signal 382, the gate voltage control signal 385, the gate clear control signal 386, and the output register voltage control signal 388). The second set of signals may specify which of the control signals was sent. In a particular embodiment, the control logic 314 provides the second set of signals to the learning logic 316 after the control logic 314 has sent a reduce power control signal. The learning logic 316 may detect the usage of the individual components of the at least one controllable energy consuming module in a manner that differs from the predicted future usage. In response to detecting the usage of the individual components in a manner that differs from predicted future usage, the learning logic 316 may update the prediction logic 316.

Detecting the usage of the individual modules in a manner that differs from the predicted future usage may include measuring a wake-up delay. In a particular embodiment, the wake-up delay is determined based on a calculation of a difference in time between a time of the wake-up control signal and a time of usage of the individual components of the at least one controllable energy consuming module. For example, the prediction rule 322 may predict usage of the gates 375 occurring five seconds after the input registers 370 receive an input from either the data bus 393 or the address bus 394. In this case, actual usage of the gates 375 may occur seven seconds after the input registers 370 receive the input from the data bus 393. The wake-up delay of two seconds could be used to adjust the prediction rule 322 so that the prediction rule 322 more accurately predicts future usage by occurring seven seconds after input is received at the input registers 370. The wake-up control signal may be sent to the individual components via the control signals (e.g., the input register voltage control signal 382, the gate voltage control signal 385, the gate clear control signal 386, and the output register voltage control signal 388). The second set of signals received from the control logic 314 may indicate the time that the wake-up control signal was sent and which of the individual components was awakened. The first set of signals received from the detection logic 110 may indicate the time of usage of one of the individual components of the at least one controllable energy consuming module. For example, the learning logic 316 may calculate that there is a two hour time gap between a wake-up control signal sent at 6:00 am and usage of the input registers 370 occurring at 8:00 am. The learning logic 316 may update the prediction logic 312 based on the measured wake-up delay. In this case, the prediction rule 322 may be updated based on the measured wake-up delay.

In a particular embodiment, detecting the usage of the individual components in a manner that differs from the predicted future usage may include measuring an error. The error may be measured in response to the prediction rule 322 predicting a particular individual component will not be used and a detected usage of the particular individual component occurs within a threshold time period. The measurement of the error may include calculating a difference between a time the future usage was predicted to occur and a time the usage of the particular individual component occurred. For example, the learning logic 316 may calculate an error of fifteen minutes based on the first set of signals received from the detection logic 310 indicating the time the usage of the gates 375 occurred at 8:00 pm and based on the future usage of the gates 375 predicted to occur at 7:45 pm. The learning logic 316 may update the prediction logic 312 based on the measured error. In this case, the prediction rule 322 may be updated based on the measured error. The prediction logic 312 may contain a plurality of prediction rules, such as the prediction rule 322, predicting the future usage of the individual components of the at least one controllable energy consuming module.

By providing the feedback signal to the prediction logic 312, the prediction engine 304 may provide enhanced and improved prediction rules to evolve and adapt to a specific way that the individual components of the energy consuming module 300 consume energy. In this manner, the energy levels of the individual components of the energy consuming module 300 may have different energy levels based on a specific energy consuming module environment. By actively and selectively controlling the energy level of the individual components of the energy consuming module 300, the control logic 314 may control an overall energy level of the energy consuming module 300. Controlling the overall energy level of the energy consuming module 300 by controlling the energy level of the individual components may allow the energy consuming module 300 to consume energy more efficiently.

Figure 4:
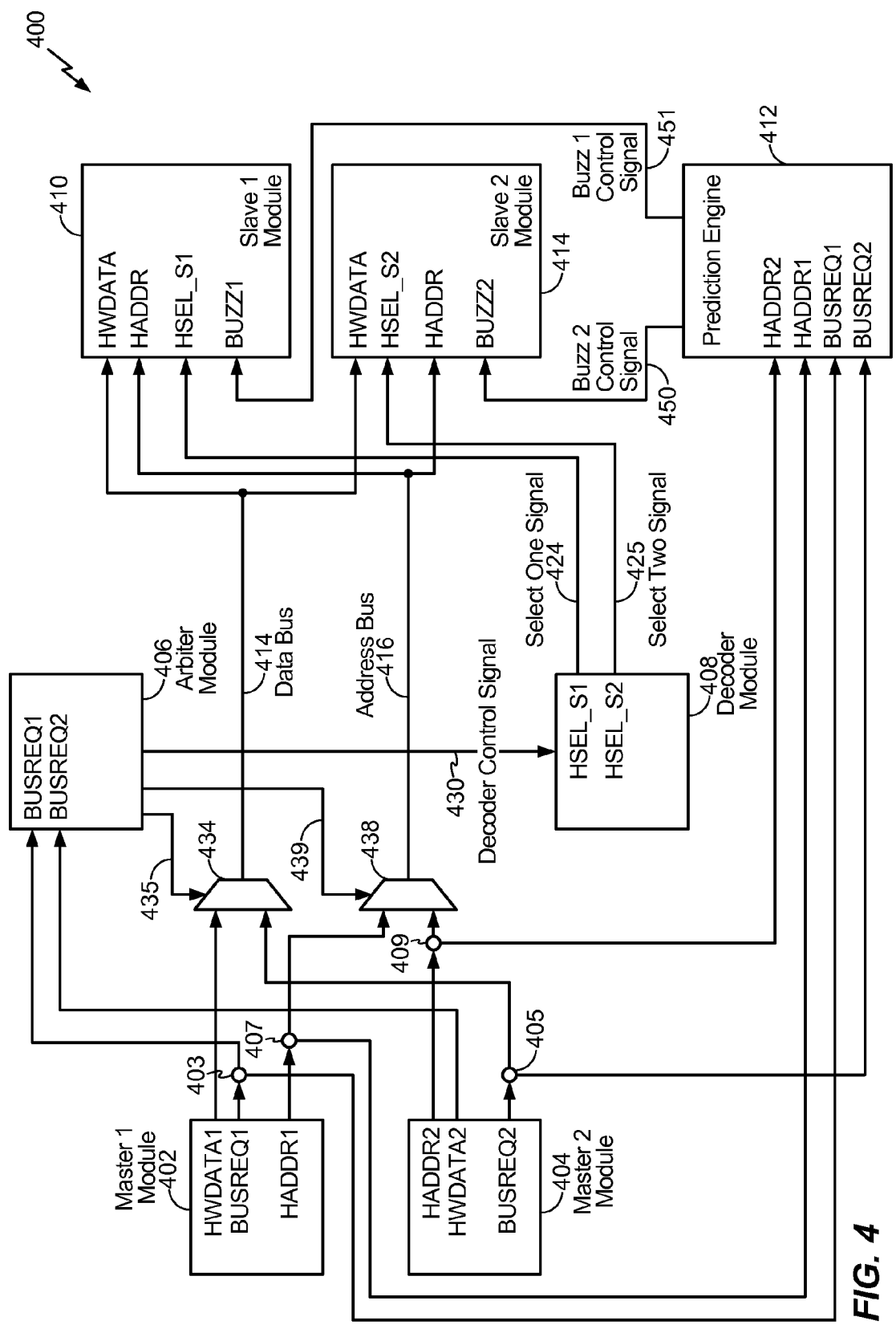
FIG. 4 is a block diagram of an illustrative embodiment of a system that includes a prediction engine.

Referring to FIG. 4, an illustrative embodiment of a system 400 that includes master modules (e.g., a master one module 402 and a master two module 404) is disclosed. The system 400 also includes sensors (e.g., a master one module address sensor 407, a master two module address sensor 409, a master one bus request sensor 403, and a master two bus request sensor 405). The system 400 also includes a data bus multiplexer 434, an address bus multiplexer 438, an arbiter module 406, a decoder module 408, slave modules (e.g., a slave one module 410 and a slave two module 414), and a prediction engine 412.

The master modules 402 and 404 may be configured to transmit data information and address information directed to the slave modules 410 and 414. The data bus multiplexer 434 may be configured to receive the data information from the master modules 402 and 404 and to transmit the data information to a data bus 414. The address bus multiplexer 438 may be configured to receive the address information from the master modules 402 and 404 and to transmit the address information to an address bus 416. The arbiter module 406 may be configured to control the data bus multiplexer 434 and the address bus multiplexer 438. In a particular embodiment, the arbiter module 406 is configured to instruct the decoder 408 to send a select one signal 424 to the slave one module 410, a select two signal 425 to the slave two module 414, or any combination thereof. The select one signal 424 may be used to change the energy level of the slave one module 410 and the select two signal 425 may be used to change the energy level of the slave two module 414. In this manner, the decoder 408 may be configured to control the energy levels of the slave modules 410 and 414.

In a particular embodiment, the prediction engine 412 receives sensed data from the sensors (e.g., the master one module address sensor 407, the master two module address sensor 409, the master one bus request sensor 403, and the master two bus request sensor 405). The prediction engine 412 may provide a buzz one control signal 451 to the slave one module 410. The buzz one control signal 451 may change the energy level of the slave one module 410. The prediction engine 412 may provide a buzz two control signal 450 to the slave two module 414. The buzz two control signal 450 may change the energy level of the slave two module 414. In this manner, the prediction engine 412 may be configured to control the energy levels of the slave modules 410 and 414.

During operation, the master modules 402 and 404 may transmit the address information, such as the addresses of the slave modules 410 and 414, to the address bus multiplexer 438. The master modules 402 and 404 may transmit the data information, which may include data directed to the slave modules 410 and 414, to the data bus multiplexer 434. The master modules 402 and 404 may transmit bus request signals to the arbiter module 406. In response to receiving the bus request signals, the arbiter module 406 may send a decoder control signal 430 to the decoder 408 that instructs the decoder 408 to send the select one control signal 424 to the slave one module 410, the select two control signal 425 to the slave two module 414, or any combination thereof.

In response to receiving the bus request signals from either of the master modules 402 and 404, the arbiter module 406 may send a data bus multiplexer control signal 435 to the data bus multiplexer 434. The data bus multiplexer control signal 435 may instruct the data bus multiplexer 434 to enable access to the data bus 414 to either the master one module 402 or to the master two module 404. In a particular embodiment, whether the data bus multiplexer control signal 435 instructs the data bus multiplexer 434 to enable access to the data bus 414 to the master one module 302 or the master two module 404 depends on which of the master modules 402 and 404 the bus requests originated from. Based on the instructions contained within the data bus multiplexer control signal 435, the data information transmitted by the data bus multiplexer 434 may have originated from either the master one module 402 or the master two module 404.

In response to receiving the bus request signals from either of the master modules 402 and 404, the arbiter module 406 may send an address bus multiplexer control signal 439 to the address bus multiplexer 438. The address bus multiplexer control signal 439 may instruct the address bus multiplexer 438 to enable either the master one module 402 to access the address bus 416 to either the master one module 402 or the master two module 404. In a particular embodiment, whether the address bus multiplexer control signal 439 instructs the address bus multiplexer 438 to enable the master one module 302 or the master two module 404 to access the address bus 416 depends on which of the master modules 402 and 404 the bus requests originated from. Based on the instructions contained within the address bus multiplexer control signal 439, the address information transmitted by the address bus multiplexer 438 may have originated from either the master one module 402 or the master two module 404.

Sensed data from any of the sensors (e.g., the master one module address sensor 407, the master two module address sensor 409, the master one bus request sensor 403, and the master two bus request sensor 405) may be provided to the prediction engine 412. Based on the sensed data from the sensors, the prediction engine 412 may determine historical usage patterns of the slave modules 410 and 414. The historical usage pattern may indicate the previous usage of the slave one module 410, the slave two module 414, or any combination thereof.

In a particular embodiment, the sensed data from the sensors may be used by the prediction engine 412 to detect the historical usage pattern of the slave modules 410 and 414. The sensed data may indicate that the slave one module 410 has been previously used during a particular time period after the slave two module 414 is used. For example, the historical usage pattern may indicate that the slave one module 410 is used sixty-five seconds after the slave two module 414 is used. The sensed data may indicate that the slave one module 410 is not used for a particular time following the use of the slave two module 414. For example, the historical usage pattern may indicate that the slave one module 410 is not used for at least ten minutes after the slave two module 414 is used. Based on the historical usage pattern, the prediction engine 412 may create a prediction rule that predicts the future usage of the slave modules 410 and 414. For example, the prediction rule may indicate that the slave one module 410 will not be used for the particular time following the use of the slave two module 414. In response to detecting one of the historical usage patterns after the prediction rule was created, the prediction engine 412 may control the energy level of either slave module based on the predicted future usage.

The prediction engine 412 may control the energy level of the slave modules 410 and 414 by sending a control signal (e.g., the buzz one control signal 451, the buzz two control signal 450). For example, the prediction engine 412 detects that the slave two module 414 will be used. Based on the prediction of the prediction rule indicating that the slave one module 410 will not be used for the particular time following the slave two module 414 being used, the prediction engine 412 may control the energy level of the slave one module 410. To control the energy level of the slave one module 410, the prediction engine 412 may send the buzz one control signal 451 to the slave one module 410. The buzz one control signal 451 may be used to change the energy level of the slave one module 410. For example, the prediction engine 412 may send a wake-up signal via the buzz one control signal 451 that increases the energy level of the slave one module 410. As another example, the prediction engine 412 may send a reduce power signal via the buzz one control signal 451 that decreases the energy level of the slave one module 410.

In a particular embodiment, the prediction engine 412 may update the prediction rule based on sensed data received after the prediction rule was created. Based on the sensed data, the prediction engine 412 may detect usage of the slave modules 410 and 414 in a manner that differs from the future usage predicted by the prediction rule. In response to detecting usage of the slave modules 410 and 414 in a manner that differs from the predicted future usage, the prediction engine 412 may update the prediction rule. In this manner, the prediction engine 412 continuously learns from actual usage and improves predictions of future usage.

Detecting the usage of the slave modules 410 and 414 in a manner that differs from the predicted future usage may comprise measuring a wake-up delay. In a particular embodiment, the wake-up delay comprises a calculation of a difference in time between a time of the wake-up control signal and a time of usage of the at least one controllable energy consuming module. The wake-up control signal may be sent to the slave modules 410 and 414 via the control signals (e.g., the buzz one control signal 451, the buzz two control signal 450). For example, the prediction engine 412 may calculate that there is a two hour time gap between a wake-up control signal sent via the buzz one control signal 451 at 6:00 am and usage of the slave one module 410 occurring at 8:00 am. The prediction engine 412 may update the prediction rule based on the measured wake-up delay.

In a particular embodiment, detecting the usage of the slave modules 410 and 414 in a manner that differs from the predicted future usage may comprise measuring an error in response to the prediction rule predicting a particular slave module will not be used and a detected usage of the particular slave module occurs within a threshold time period. The measurement of the error may include calculating a difference between a time that the future usage was predicted to occur and a time that the usage of the particular slave module actually occurred. For example, the prediction engine may calculate an error of fifteen minutes based on actual usage of the slave one module 410 at 8:00 pm and based on the predicted future usage of the slave one module 410 at 7:45 pm. The prediction engine 412 may update the prediction rule based on the measured error. Updating the prediction rule may include creating a new prediction rule or deleting an older prediction rule. For example, the prediction rule that predicted a future usage at 7:45 pm may be deleted and a new prediction rule that predicts a future usage at 8:00 pm may be created.

The prediction engine 412 may determine that one of the slave modules 410 and 414 will be used based on the sensed data. The prediction engine 412 may be able to power-up the slave modules 410 and 414 before the decoder module 408 sends the select one signal 424 or the select two signal 425. For example, the prediction engine 412 may send the buzz one control signal 451 to the slave one module 410 in response to receiving sensed data that includes the address of the slave one module 410. The buzz one control signal 451 may instruct the slave one module 410 to power-up. By receiving the sensed data before the bus requests are processed by the arbiter module 406, the prediction engine 412 may be able to send the control signals to the slave modules 410 and 414 before the decoder module 408 can be instructed to send the select control signals. In this manner, the prediction engine 412 may improve the efficiency of the system 400 by controlling the energy levels of the slave modules 410 and 414 before the decoder 408 can control the energy levels. For example, the prediction engine 412 may power up the slave modules 410 and 414 before the requests for usage from the master modules 402 and 404 arrive at the slave modules 410 and 414.

Figure 5:
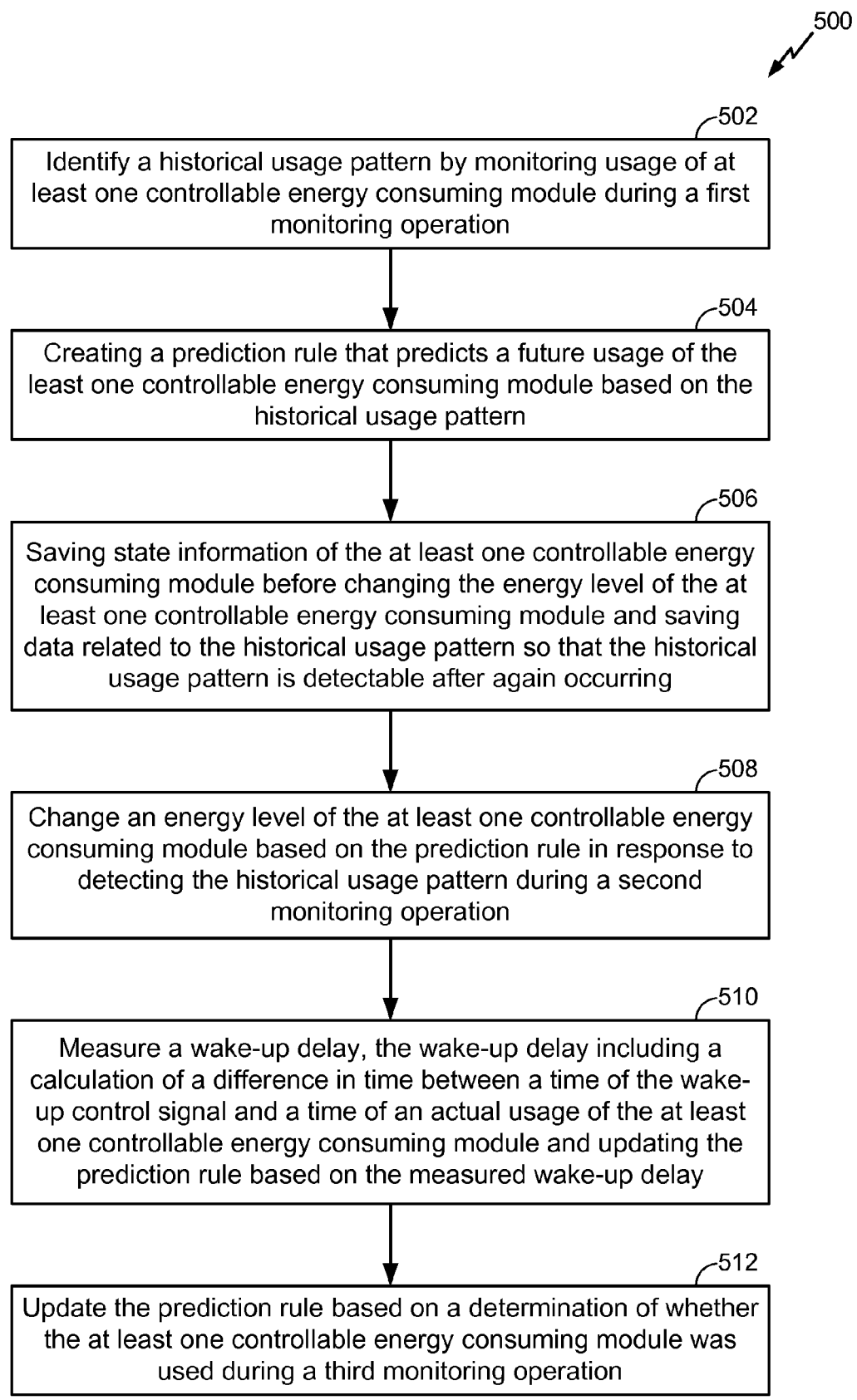
FIG. 5 is a flow diagram of a first illustrative embodiment of a method of operating a prediction engine.

Referring to FIG. 5, a particular embodiment of a method 500 of controlling energy usage is disclosed. The method 500 includes identifying a historical usage pattern by monitoring usage of at least one controllable energy consuming module during a first monitoring operation, at 502. The method further includes creating a prediction rule that predicts a future usage of the at least one controllable energy consuming module based on the historical usage pattern, as shown at 504. Optionally, the method includes saving state information of the at least one controllable energy consuming module before changing an energy level of the at least one controllable energy consuming module and saving data related to the historical usage pattern so that the historical usage pattern is detectable after the historical usage pattern subsequently occurs, as shown at 506. The method further includes changing the energy level of the at least one controllable energy consuming module based on the prediction rule in response to detecting the historical usage pattern during a second monitoring operation, at 508. Optionally, the method may include measuring a wake-up delay, at 510. The wake-up delay may include a calculation of a difference in time between a time of a wake-up control signal and a time of usage of the at least one controllable energy consuming module. The method further includes updating the prediction rule based on a determination of whether the energy consuming module was used during a third monitoring operation, at 512. In a particular embodiment, where the wake-up delay was measured, at 510, the prediction rule is also updated based on the measured wake-up delay. In a particular illustrative embodiment, the energy level is changed by sending the wake-up control signal to the at least one controllable energy consuming module before a time that is indicated by the predicted future usage. In a particular implementation of the method 500, the steps of identifying the historical usage pattern, creating the prediction rule, changing the energy level of the at least one controllable energy consuming module, and updating the prediction rule are performed at a processor of an electronic device. For example, the processor may be integrated into a device such as a set-top box, a music player, a video player, an entertainment unit, a navigation device, a communication device, a personal digital system (PDA), a fixed location data unit, or a computer. An example of a suitable electronic device is a cellular telephone or other portable electronic device.

The method steps illustrated in FIG. 5 may be performed in connection with the apparatus and system described in FIGS. 1-4. For example, the method of identifying a historical usage pattern by monitoring usage of the at least one controllable energy consuming module, at 502, may be performed by the detection logic 110 illustrated in FIG. 1 and FIG. 2. Similarly, predicting usage of the energy consuming module based on the usage pattern, at 504, may be performed by the prediction logic 112 illustrated in FIG. 1 and FIG. 2. Alternatively, the method of creating the prediction rule that predicts the future usage of the at least one controllable energy consuming module based on the historical usage pattern, at 504, may be implemented by the prediction logic 312 of FIG. 3 or the prediction engine 412 of FIG. 4. As a further example, the saving state information, at 506, and saving data associated with the state information, may be stored at a memory such as a memory within the prediction engine 104 of FIG. 1. In addition, the method step of changing the energy level of the at least one controllable energy consuming module based on the prediction rule, at 508, may be performed by control logic such as the control logic 114 of FIGS. 1-2 or the control logic 314 of FIG. 3. In addition, the update of the prediction rule based on the determination of whether the at least one controllable energy consuming module was used during the third monitoring operation, at 512, may be performed by learning logic such as the learning logic 116 of FIGS. 1-2 or the learning logic 316 of FIG. 3. The method of monitoring usage and selectively controlling energy levels of FIG. 5 may be implemented in one or more apparatus, devices, or systems as illustrated in FIGS. 1-4.

Figure 6:
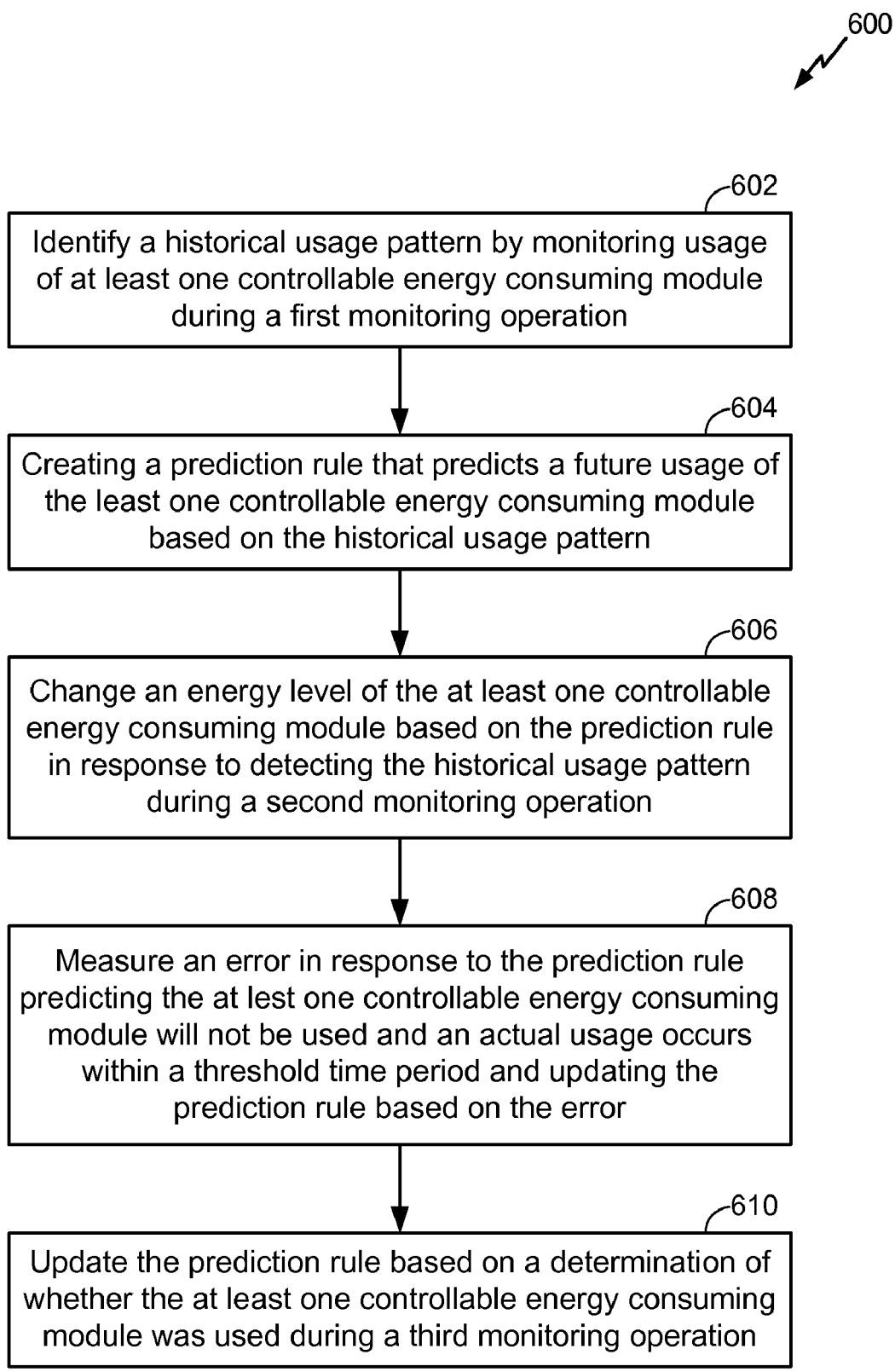
FIG. 6 is a flow diagram of a second illustrative embodiment of a method of operating a prediction engine.

FIG. 6 is a flow diagram of a particular embodiment of a method 600 of monitoring usage of energy consuming modules and controlling energy levels of the energy consuming modules. In a particular embodiment, the method 600 is performed by any of the systems of FIGS. 1-4 or any combination thereof. The method includes identifying a historical usage pattern by monitoring usage of at least one controllable energy consuming module, at 602. For example, in FIGS. 1-2, the detection logic 110 identifies a historical usage pattern 120. The method further includes creating a prediction rule that predicts a future usage of the at least one controllable energy consuming module based on the historical usage pattern, as shown at 604. For example, in FIGS. 1-2, the prediction logic 112 creates the prediction rule 122 based on the historical usage pattern 120. The method further includes changing an energy level of the at least one controllable energy consuming module based on the prediction rule in response to detection of the historical usage pattern during a second monitoring operation, at 606. For example, in FIGS. 1-2, the control logic 114 changes the energy level of the at least one controllable energy consuming module 106 based on the prediction rule 122 in response to detection of the historical usage pattern 120 during a second monitoring operation. Optionally, the method includes measuring an error after the prediction rule predicts the at least one controllable energy consuming module will not be used and a detected usage occurs within a threshold time period, as shown at 608. For example, in FIGS. 1-2, the learning logic 116 measures the error after the prediction rule 122 predicts the energy consuming module 106 will not be used and a detected usage of the energy consuming module 106 occurs. The method further includes updating the prediction rule based on a determination of whether the at least one controllable energy consuming module was used during a third monitoring operation. For example, in FIGS. 1-2 the learning logic 116 updates the prediction rule 122 based on the determination of whether the energy consuming module 106 was used during a third monitoring operation.

Determining whether the energy consuming module 106 was used during a third monitoring operation may include detecting usage of the energy consuming module 106 in a manner that differs from the predicted future usage. For example, the learning logic 116 may determine that the energy consuming module 106 was used when the prediction rule predicted that the energy consuming module 106 would not be used.

In a particular embodiment, the energy level is changed by sending a reduce power control signal to the at least one controllable energy consuming module. In addition, measuring the error may include calculating a difference in time between a time when the reduced power control signal was sent and a time when the detected usage of the at least one controllable energy consuming module by the user occurred. Optionally, the method 600 may include measuring an error after the predicted usage fails to predict the usage of the at least one controllable energy consuming module within a threshold time period, at 608. Updating the prediction rule based on the determination of whether the energy consuming module is used during a third monitoring operation may include updating the prediction rule based on the error measurements. For example, the particular prediction rule responsible for the erroneous prediction may be removed from a list of prediction rules.

Figure 7:
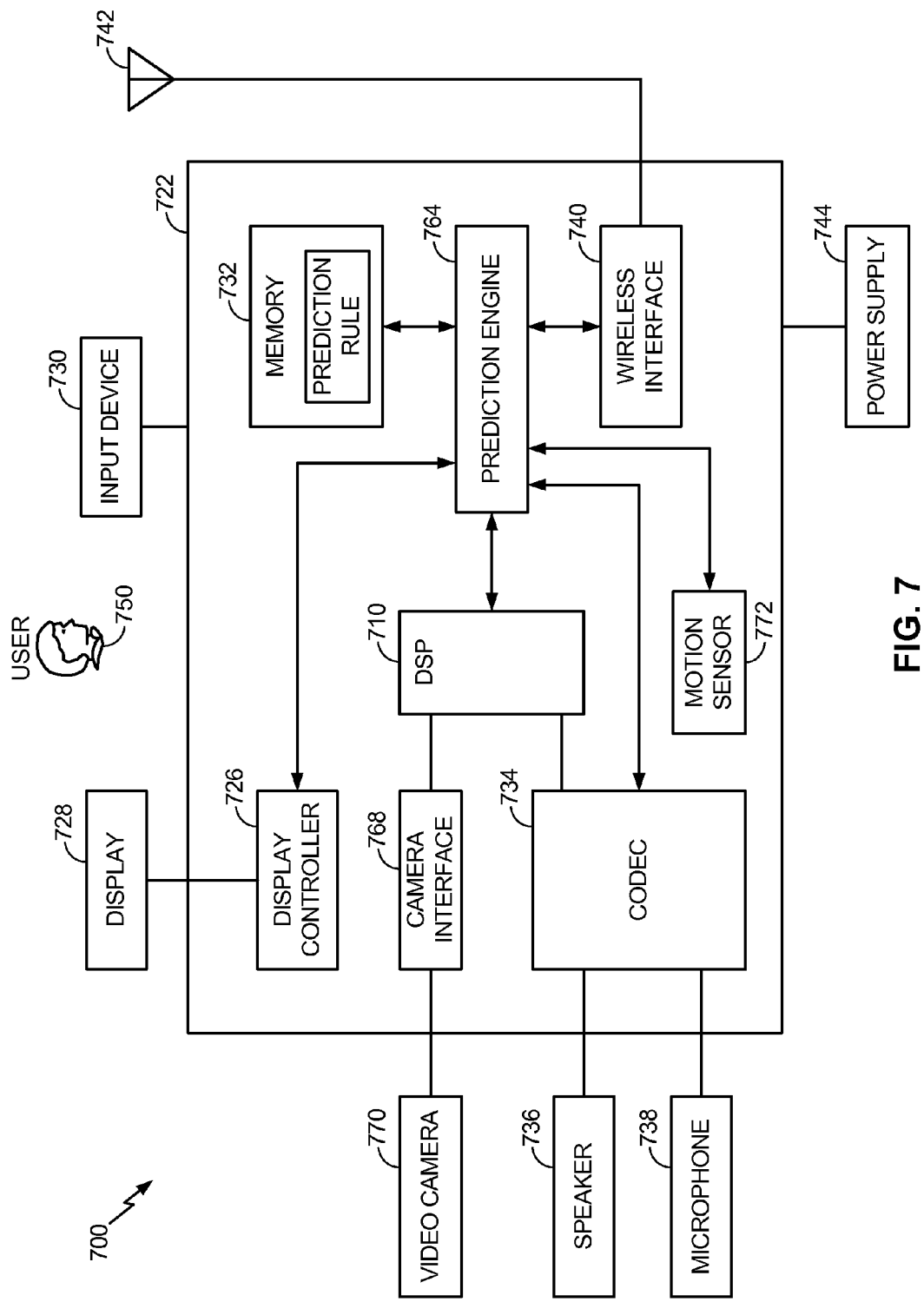
FIG. 7 is a block diagram of a particular embodiment of a wireless communication device that includes a prediction engine.

FIG. 7 is a block diagram of an embodiment of a wireless communication device 700 having a prediction engine 764. The wireless communication device 700 may be implemented as a portable wireless electronic device that includes a processor 710, such as a digital signal processor (DSP), coupled to a memory 732. In an illustrative example, the prediction engine 764 includes one or more of the modules or apparatuses of FIGS. 1-4, operates in accordance with any of the embodiments or methods of FIGS. 5-6, or any combination thereof. The prediction engine 764 may be at the processor 710 or may be a separate device.

In one embodiment, the wireless communication device 700 includes a camera interface 768 that is coupled to the processor 710 and also coupled to a camera, such as a video camera or still camera 770. A display controller 726 is coupled to the processor 710 and to a display device 728. A coder/decoder (CODEC) 734 can also be coupled to the processor 710. A speaker 736 and a microphone 738 can be coupled to the CODEC 734. A wireless interface 740 can be coupled to the processor 710 and to a wireless antenna 742. The prediction engine 764 is coupled to the motion sensor 772, the wireless interface 740, the DSP 710, the CODEC 734, the camera interface 768, and the display controller 726. In a particular embodiment, the prediction engine 764 is adapted to receive sensed data from the outputs of the modules of the wireless communication device 700 and to control the energy level of the modules (e.g., the camera interface 768, the display controller 726, the CODEC 734, the motion sensor 772, and the wireless interface 740) by sending control signals.

In a particular embodiment, the signal processor 710, the display controller 726, the memory 732, the CODEC 734, the wireless interface 740, and the camera interface 768 are included in a system-in-package or system-on-chip device 722. In a particular embodiment, an input device 730 and a power supply 744 are coupled to the system-on-chip device 722. Moreover, in a particular embodiment, as illustrated in FIG. 7, the display device 728, the input device 730, the speaker 736, the microphone 738, the wireless antenna 742, the video camera 770, and the power supply 744 are external to the system-on-chip device 722. However, each of the display device 728, the input device 730, the speaker 736, the microphone 738, the wireless antenna 742, the video camera 770, and the power supply 744 can be coupled to a component of the system-on-chip device 722, such as an interface or a controller.

In a particular embodiment, the prediction engine 764 uses a prediction rule that predicts a future usage of at least one controllable energy consuming module in the system-on-chip device 722. For example, the at least one controllable energy consuming module may be the display controller 726, the digital signal processor 710, the CODEC 734, the memory 732, or the wireless interface 740.

In a particular embodiment, the at least one controllable energy consuming module functions as a wireless local area network (WLAN) module, such as the wireless interface 740. The prediction engine 764 may detect that the WLAN module was not used during a first time period. For example, the user 750 may not use the WLAN module while is sleeping. In response to the WLAN module not being used while the user 750 is sleeping, the prediction engine 764 may detect a historical usage pattern indicating that the WLAN module was not used during the hours of 1:00 am to 6:00 am. In a particular embodiment, the prediction rule may be created based on a first historical usage pattern that indicates that the at least one controllable energy consuming module was not used by a user 750 during a first time period. For example, the prediction engine 764 may create the prediction rule based on the first historical usage pattern indicating that the WLAN module was not used during the hours of 1:00 am to 6:00 am. In response to the first historical usage pattern indicating that the WLAN module has previously not been used during the hours of 1:00 am to 6:00 am, the prediction rule may be created where the prediction rule predicts that the WLAN module will not be used in the future during the hours of 1:00 am to 6:00 am.

In a particular embodiment, the prediction engine 764 detects the occurrence of the first time period some time after the prediction rule was created. For example, the prediction engine 764 may detect a current time is 1:00 am. In a particular embodiment, the energy level of the at least one controllable energy consuming module is reduced in response to detecting the first time period, where the prediction rule indicates that the user 750 will not use the at least one controllable energy consuming module during the first time period. For example, the prediction engine 764 may reduce the energy level of the WLAN module in response to detecting that the current time is 1:00 am and the prediction rule indicating that the WLAN module will not be used until 6:00 am.

In a particular embodiment, the prediction engine 764 detects that the WLAN module was not used during a second time period when an output of the motion sensor 772 indicated movement. For example, the WLAN module may not be used when the wireless communication device 700 is moving around (e.g., the user 750 is jogging with the wireless communication device 700). In a particular embodiment, the prediction rule is created based on a second historical usage pattern that indicates that the at least one controllable energy consuming module was not used by the user 750 during a time period when an output of the motion sensor 772 indicated movement. The motion sensor may be selected from a group consisting of a global positioning system (GPS) receiver, an accelerometer, an altimeter, or any combination thereof. For example, the prediction engine 764 may create the prediction rule based on the second historical usage pattern indicating that the WLAN module was not used while the output of the motion sensor 772 indicated movement. In response to the second historical usage pattern indicating that the WLAN module has previously not been used while the output of the motion sensor 772 indicated movement, the prediction rule may be created where the prediction rule predicts that the WLAN module will not be used when the output of the motion sensor 772 indicates movement.

In a particular embodiment, the prediction engine 764 detects an output from the motion sensor 772 indicating movement some time after the prediction rule was created. For example, the motion sensor 772 may indicate movement as the user 750 begins jogging. In a particular embodiment, an energy level of the at least one controllable energy consuming module is reduced in response to the prediction rule, where the prediction rule indicates that the user will not use the at least one controllable energy consuming module while the output of the motion sensor indicates movement. For example, in response to detecting the indication of movement (e.g., the user 750 begins to jog), the prediction engine 764 may reduce the energy level of the WLAN module.

In a particular embodiment, the at least one controllable energy consuming module functions as a transceiver module, such as the wireless interface 740. The wireless interface 740 may contain circuitry that allows for dual mode communication. For example, the wireless interface 740 may contain first circuitry for sending and receiving data over an internet protocol local area network (IP-LAN) network and second circuitry for sending and receiving data over a cell phone network. In this manner, the illustrated wireless interface 740 may function as the WLAN module, the transceiver module, or any combination thereof. The transceiver module may be used to connect with a cell phone network.

The prediction engine 764 may detect that the transceiver module was not used while an output of the motion sensor 722 indicates a rapid increase in altitude. For example, following take-off, an airplane may quickly rise to an altitude that the transceiver module is unable to connect to a cell phone network. In response to the transceiver module not be used after a rapid increase in altitude, the prediction engine 764 may detect a historical usage pattern of the transceiver module not being used after a rapid increase in altitude is detected. In a particular embodiment, the prediction rule is created based on a third historical usage pattern that indicates the user 750 did not use the at least one controllable energy consuming module after an output of the motion sensor 722 indicated a rapid increase in altitude. The prediction rule may predict that the transceiver module will not be used after the motion sensor 722 indicates a rapid increase in altitude.

In a particular embodiment, the prediction engine 764 detects an output from the motion sensor 772 indicating a rapid increase in altitude some time after the prediction rule was created. For example, the motion sensor 772 may indicate the rapid increase in altitude when the wireless communication device 700 is carried on an airplane that is taking off. In a particular embodiment, an energy level of the at least one controllable energy consuming module functioning as the transceiver module is reduced in response to detecting that the altimeter indicates a rapid increase in altitude.

The prediction engine 764 may reduce the energy level of the at least one controllable energy consuming module functioning as the transceiver module in response to detecting that the motion sensor 772 indicates a rapid increase in altitude. In a particular embodiment, actual usage of one or more modules by a user is detected, tracked, monitored and then applied through learning logic 116 of the prediction engine 104 to further refine energy control.

Figure 8:
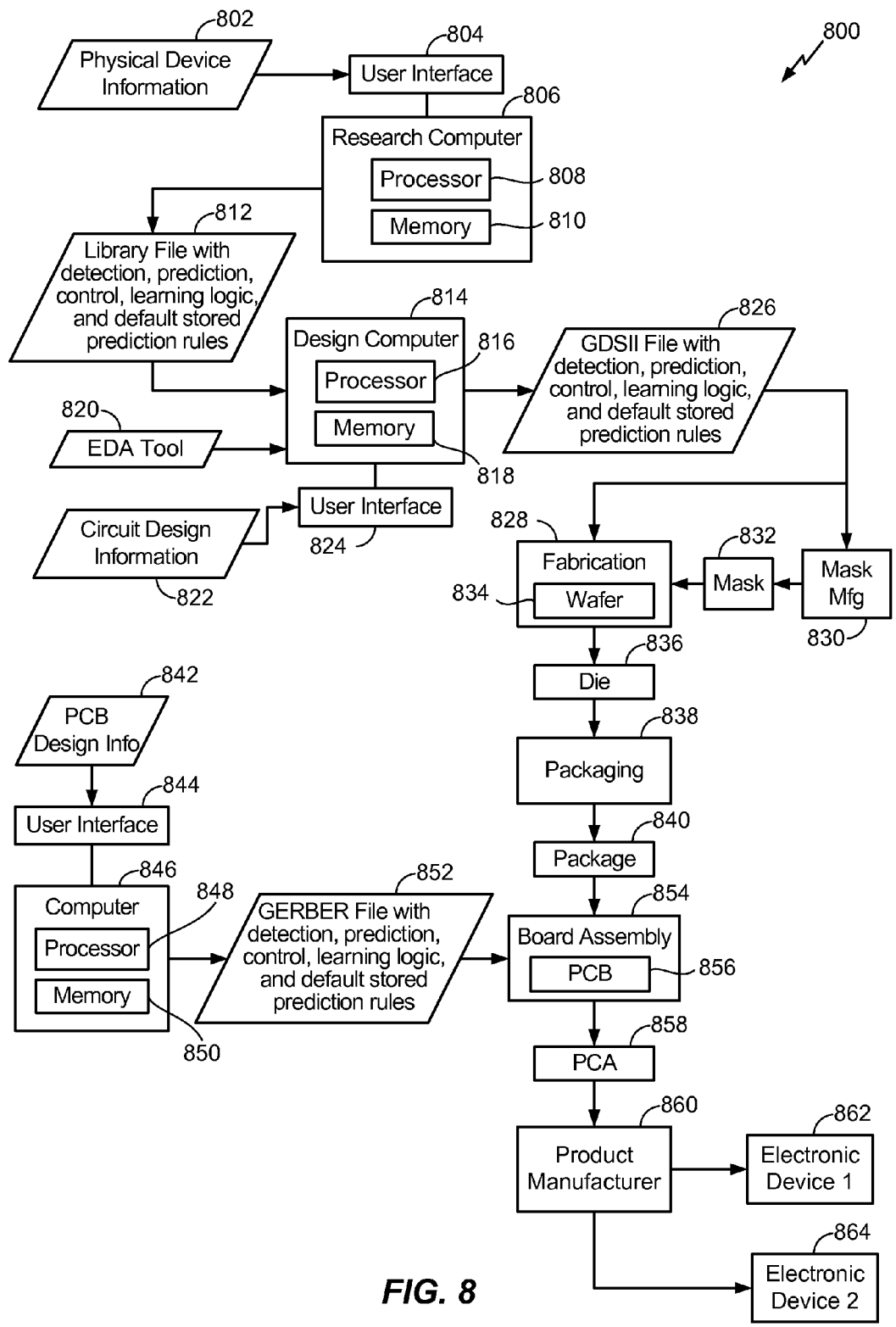
FIG. 8 is a data flow diagram illustrating a manufacturing process for use with a device that includes a prediction engine.

FIG. 8 depicts a particular illustrative embodiment of an electronic device manufacturing process 800. Physical device information 802 is received at the manufacturing process 800, such as at a research computer 806. The physical device information 802 may include design information representing at least one physical property of a semiconductor device, such as the apparatus 100 of FIG. 1, the apparatus 200 of FIG. 2, the apparatus 300 of FIG. 3, the apparatus 400 of FIG. 4, or any combination thereof. For example, the physical device information 802 may include physical parameters, material characteristics, and structure information that is entered via a user interface 804 coupled to the research computer 806. The research computer 806 includes a processor 808, such as one or more processing cores, coupled to a computer readable medium such as a memory 810. The memory 810 may store computer readable instructions that are executable to cause the processor 808 to transform the physical device information 802 to comply with a file format and to generate a library file 812.

In a particular embodiment, the library file 812 includes at least one data file including the transformed design information. For example, the library file 812 may include a library of semiconductor devices including a device that includes the prediction engine 104 of FIG. 1 (e.g., the apparatus 100 of FIG. 1), a device that includes the prediction engine 104 of FIG. 2 (e.g., the apparatus 200 of FIG. 2), a device that includes the prediction engine 304 of FIG. 3 (e.g. the apparatus 300 of FIG. 3), a device that includes the prediction engine 412 of FIG. 4 (e.g., the apparatus 400 of FIG. 4), or any combination thereof, that is provided to use with an electronic design automation (EDA) tool 820. The library file 812 may also include default stored prediction rules, such as prediction rule 122 in FIG. 1 and FIG. 2 and prediction rule 322 in FIG. 3. The default prediction rules may include a prediction rule that predicts individual modules of the electronic device will not be used when a motion sensor indicates movement (e.g., a rapid increase in altitude or movement such as jogging).

The library file 812 may be used in conjunction with the EDA tool 820 at a design computer 814 including a processor 816, such as one or more processing cores, coupled to a memory 818. The EDA tool 820 may be stored as processor executable instructions at the memory 818 to enable a user of the design computer 814 to design a circuit including a device that includes the prediction engine 104 of FIG. 1 (e.g., the apparatus 100 of FIG. 1), a device that includes the prediction engine 104 of FIG. 2 (e.g., the apparatus 200 of FIG. 2), a device that includes the prediction engine 304 of FIG. 3 (e.g. the apparatus 300 of FIG. 3), a device that includes the prediction engine 412 of FIG. 4 (e.g., the apparatus 400 of FIG. 4), or any combination thereof, of the library file 812. For example, a user of the design computer 814 may enter circuit design information 822 via a user interface 824 coupled to the design computer 814. The circuit design information 822 may include design information representing at least one physical property of a semiconductor device, such as a device that includes the prediction engine 104 of FIG. 1 (e.g., the apparatus 100 of FIG. 1), a device that includes the prediction engine 104 of FIG. 2 (e.g., the apparatus 200 of FIG. 2), a device that includes the prediction engine 304 of FIG. 3 (e.g. the apparatus 300 of FIG. 3), a device that includes the prediction engine 412 of FIG. 4 (e.g., the apparatus 400 of FIG. 4), or any combination thereof. The circuit design information 822 may also include default stored prediction rules, such as prediction rule 122 in FIG. 1 and FIG. 2 and prediction rule 322 in FIG. 3. To illustrate, the circuit design property may include identification of particular circuits and relationships to other elements in a circuit design, positioning information, feature size information, interconnection information, or other information representing a physical property of a semiconductor device.

The design computer 814 may be configured to transform the design information, including the circuit design information 822, to comply with a file format. To illustrate, the file formation may include a database binary file format representing planar geometric shapes, text labels, and other information about a circuit layout in a hierarchical format, such as a Graphic Data System (GDSII) file format. The design computer 814 may be configured to generate a data file including the transformed design information, such as a GDSII file 826 that includes information describing the prediction engine of FIG. 1, the prediction engine of FIG. 2, the prediction engine of FIG. 3, the prediction engine of FIG. 4, or any combination thereof, in addition to other circuits or information. The GDSII file 826 may also include default stored prediction rules, such as prediction rule 122 in FIG. 1 and FIG. 2 and prediction rule 322 in FIG. 3. To illustrate, the data file may include information corresponding to a system-on-chip (SOC) that includes the prediction engine of FIG. 1 and that also includes additional electronic circuits and components within the SOC.

The GDSII file 826 may be received at a fabrication process 828 to manufacture the prediction engine of FIG. 1, the prediction engine of FIG. 2, the prediction engine of FIG. 3, the prediction engine of FIG. 4, or any combination thereof, according to transformed information in the GDSII file 826. For example, a device manufacture process may include providing the GDSII file 826 to a mask manufacturer 830 to create one or more masks, such as masks to be used with photolithography processing, illustrated as a representative mask 832. The mask 832 may be used during the fabrication process to generate one or more wafers 834, which may be tested and separated into dies, such as a representative die 836. The die 836 includes a circuit including a device that includes the prediction engine 104 of FIG. 1 (e.g., the apparatus 100 of FIG. 1), a device that includes the prediction engine 104 of FIG. 2 (e.g., the apparatus 200 of FIG. 2), a device that includes the prediction engine 304 of FIG. 3 (e.g. the apparatus 300 of FIG. 3), a device that includes the prediction engine 412 of FIG. 4 (e.g., the apparatus 400 of FIG. 4), or any combination thereof.

The die 836 may be provided to a packaging process 838 where the die 836 is incorporated into a representative package 840. For example, the package 840 may include the single die 836 or multiple dies, such as a system-in-package (SiP) arrangement. The package 840 may be configured to conform to one or more standards or specifications, such as Joint Electron Device Engineering Council (JEDEC) standards.

Information regarding the package 840 may be distributed to various product designers, such as via a component library stored at a computer 846. The computer 846 may include a processor 848, such as one or more processing cores, coupled to a memory 850. A printed circuit board (PCB) tool may be stored as processor executable instructions at the memory 850 to process PCB design information 842 received from a user of the computer 846 via a user interface 844. The PCB design information 842 may include physical positioning information of a packaged semiconductor device on a circuit board, the packaged semiconductor device corresponding to the package 840 including the prediction engine of FIG. 1, the prediction engine of FIG. 2, the prediction engine of FIG. 3, the prediction engine of FIG. 4, or any combination thereof.

The computer 846 may be configured to transform the PCB design information 842 to generate a data file, such as a GERBER file 852 with data that includes physical positioning information of a packaged semiconductor device on a circuit board, as well as layout of electrical connections such as traces and vias, where the packaged semiconductor device corresponds to the package 840 including the prediction engine of FIG. 1, the prediction engine of FIG. 2, the prediction engine of FIG. 3, the prediction engine of FIG. 4, or any combination thereof. The GERBER file 852 may also include default stored prediction rules, such as prediction rule 122 in FIG. 1 and FIG. 2 and prediction rule 322 in FIG. 3. In other embodiments, the data file generated by the transformed PCB design information may have a format other than a GERBER format.

The GERBER file 852 may be received at a board assembly process 854 and used to create PCBs, such as a representative PCB 856, manufactured in accordance with the design information stored within the GERBER file 852. For example, the GERBER file 852 may be uploaded to one or more machines to perform various steps of a PCB production process. The PCB 856 may be populated with electronic components including the package 840 to form a representative printed circuit assembly (PCA) 858.

The PCA 858 may be received at a product manufacture process 860 and integrated into one or more electronic devices, such as a first representative electronic device 862 and a second representative electronic device 864. As an illustrative, non-limiting example, the first representative electronic device 862, the second representative electronic device 864, or both, may be selected from the group of a set top box, a music player, a video player, an entertainment unit, a navigation device, a communications device, a personal digital assistant (PDA), a fixed location data unit, and a computer, into which the at least one controllable energy consuming module is integrated. As another illustrative, non-limiting example, one or more of the electronic devices 862 and 864 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although FIG. 8 illustrates remote units according to teachings of the disclosure, the disclosure is not limited to these exemplary illustrated units. Embodiments of the disclosure may be suitably employed in any device which includes active integrated circuitry including memory and on-chip circuitry.

A device that includes the prediction engine 104 of FIG. 1 (e.g., the apparatus 100 of FIG. 1), a device that includes the prediction engine 104 of FIG. 2 (e.g., the apparatus 200 of FIG. 2), a device that includes the prediction engine 304 of FIG. 3 (e.g. the apparatus 300 of FIG. 3), a device that includes the prediction engine 412 of FIG. 4 (e.g., the apparatus 400 of FIG. 4), or any combination thereof, may be fabricated, processed, and incorporated into an electronic device, as described in the illustrative process 800. One or more aspects of the embodiments disclosed with respect to FIGS. 1-4 may be included at various processing stages, such as within the library file 812, the GDSII file 826, and the GERBER file 852, as well as stored at the memory 810 of the research computer 806, the memory 818 of the design computer 814, the memory 850 of the computer 846, the memory of one or more other computers or processors (not shown) used at the various stages, such as at the board assembly process 854, and also incorporated into one or more other physical embodiments such as the mask 832, the die 836, the package 840, the PCA 858, other products such as prototype circuits or devices (not shown), or any combination thereof. For example, the GDSII file 826 or the fabrication process 828 can include a computer readable tangible medium storing instructions executable by a computer, the instructions including instructions that are executed by the computer to perform the method 500 of FIG. 5, the method 600 of FIG. 6, or any combination thereof. Although various representative stages of production from a physical device design to a final product are depicted, in other embodiments fewer stages may be used or additional stages may be included. Similarly, the process 800 may be performed by a single entity, or by one or more entities performing various stages of the process 800.

Those of skill would further appreciate that the various illustrative logical blocks, configurations, modules, circuits, and method steps described in connection with the embodiments disclosed herein may be implemented as electronic hardware, computer software executed by a processing unit, or combinations of both. Various illustrative components, blocks, configurations, modules, circuits, and steps have been described above generally in terms of their functionality. Whether such functionality is implemented as hardware or executable processing instructions depends on the particular application and design constraints imposed on the overall system. Skilled artisans may implement the described functionality in varying ways with each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), a magnetoresistive random access memory (MRAM), a spin-torque-transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
   a processor; and
   a prediction engine including logic to be executed by the processor, the logic comprising:
   detection logic configured to determine a historical usage pattern of at least one controllable energy consuming module;
   prediction logic configured to create a prediction rule that predicts a future usage of the at least one controllable energy consuming module based on the historical usage pattern;
   control logic configured to selectively control an energy level of the at least one controllable energy consuming module based on the prediction rule; and
   learning logic configured to update the prediction logic in response to detecting usage of the at least one controllable energy consuming module in a manner that differs from the predicted future usage.

2. The apparatus of claim 1, wherein the historical usage pattern includes at least one historical usage of the at least one controllable energy consuming module.

3. The apparatus of claim 1, further comprising a plurality of energy consuming modules, wherein the historical usage pattern includes at least one historical usage of at least one energy consuming module of the plurality of external energy consuming modules.

4. The apparatus of claim 3, wherein the at least one historical usage is determined based on an output from the at least one energy consuming module.

5. The apparatus of claim 1, wherein the at least one controllable energy consuming module functions as a wireless local area network (WLAN) module.

6. The apparatus of claim 5, wherein the prediction rule is created based on a first historical usage pattern that indicates that the at least one controllable energy consuming module was not used by a user during a first time period.

7. The apparatus of claim 6, wherein the energy level of the at least one controllable energy consuming module is reduced in response to detecting the first time period, wherein the prediction rule indicates that the user will not use the at least one controllable energy consuming module during the first time period.

8. The apparatus of claim 5, wherein the prediction rule is created based on a second historical usage pattern that indicates that the at least one controllable energy consuming module was not used by a user during a second time period when the output of a motion sensor indicated movement.

9. The apparatus of claim 8, wherein the energy level of the at least one controllable energy consuming module is reduced in response to the prediction rule, wherein the prediction rule indicates that the user will not use the at least one controllable energy consuming module while an output of the motion sensor indicates movement.

10. The apparatus of claim 9, wherein the motion sensor is selected from a global positioning system (GPS) receiver, an accelerometer, and an altimeter.

11. The apparatus of claim 10, wherein the energy level is controlled by sending a reduce power control signal to the at least one controllable energy consuming module.

12. The apparatus of claim 11, wherein the prediction logic is updated after the reduce power control signal is sent.

13. The apparatus of claim 1, wherein the prediction logic updates the prediction rule in response to receiving the update from the learning logic.

14. The apparatus of claim 1, wherein the energy level is controlled by sending a wake-up control signal to the at least one controllable energy consuming module before a time that the prediction rule indicates that the at least one controllable energy consuming module will be used.

15. The apparatus of claim 14, wherein the prediction logic is updated in response to the control logic detecting the usage of the at least one controllable energy consuming module after the wake-up control signal is sent.

16. The apparatus of claim 1, wherein detecting the usage of the at least one controllable energy consuming module in a manner that differs from the predicted future usage comprises detecting usage of the at least one controllable energy consuming module during a time period, wherein the prediction rule indicates that the at least one controllable energy consuming module will not be used during the time period.

17. The apparatus of claim 1, integrated in at least one semiconductor die.

18. The apparatus of claim 1, further comprising a device selected from the group consisting of a set top box, a music player, a video player, an entertainment unit, a navigation device, a communications device, a personal digital assistant (PDA), a fixed location data unit, and a computer, into which the at least one controllable energy consuming module is integrated.

19. An apparatus comprising:
   means for determining a historical usage pattern of at least one controllable energy consuming module;
   means for creating a prediction rule that predicts a future usage of the at least one controllable energy consuming module based on the historical usage pattern;
   means for selectively controlling an energy level of the at least one controllable energy consuming module based on the prediction rule; and
   means for updating the prediction rule in response to detecting usage of the at least one controllable energy consuming module in a manner that differs from the predicted future usage.

20. The apparatus of claim 19, wherein the historical usage pattern includes at least one historical usage of at least one energy consuming module of a plurality of energy consuming modules, wherein the at least one historical usage is determined based on an output from the at least one energy consuming module.

21. The apparatus of claim 19, integrated in at least one semiconductor die.

22. The apparatus of claim 19, further comprising a device selected from the group consisting of a set top box, a music player, a video player, an entertainment unit, a navigation device, a communications device, a personal digital assistant (PDA), a fixed location data unit, and a computer, into which the at least one controllable energy consuming module is integrated.

23. A method comprising:
   identifying a historical usage pattern by monitoring usage of at least one controllable energy consuming module during a first monitoring operation;
   creating a prediction rule that predicts a future usage of the at least one controllable energy consuming module based on the historical usage pattern;
   changing an energy level of the at least one controllable energy consuming module based on the prediction rule in response to detecting the historical usage pattern during a second monitoring operation; and
   updating the prediction rule based on a determination of whether the at least one controllable energy consuming module was used during a third monitoring operation.

24. The method of claim 23, wherein the energy level is changed by sending a wake-up control signal to the at least one controllable energy consuming module before a time indicated by the prediction rule that the at least one controllable energy consuming module will be used.

25. The method of claim 24, further comprising:
measuring a wake-up delay, the wake-up delay including a calculation of a difference in time between a time of the wake-up control signal and a time of usage of the at least one controllable energy consuming module; and
updating the prediction rule based on the measured wake-up delay.

26. The method of claim 23, wherein the energy level is changed by sending a reduce power control signal to the at least one controllable energy consuming module.

27. The method of claim 26, further comprising:
measuring an error in response to the prediction rule predicting the at least one controllable energy consuming module will not be used and a detected usage occurs within a threshold time period; and
updating the prediction rule based on the measured error.

28. The method of claim 27, wherein measuring the error includes calculating a difference between a time the future usage was predicted to occur and a time the usage of the at least one controllable energy consuming module occurred.

29. The method of claim 23, further comprising saving state information of the at least one controllable energy consuming module before changing the energy level of the at least one controllable energy consuming module.

30. The method of claim 23, further comprising saving data related to the historical usage pattern so that the historical usage pattern is detectable when the historical usage pattern subsequently occurs.

31. The method of claim 23, wherein the identification of the historical usage pattern, the creation of the prediction rule, the change of the energy level of the at least one controllable energy consuming module, and the update of the prediction rule are performed at a processor integrated into electronic device.

32. A method comprising;
identifying a historical usage pattern by monitoring usage of at least one controllable energy module during a first monitoring operation, wherein the at least one controllable energy consuming module functions as a transceiver module;
creating a prediction rule that predicts a future usage of the at least one controllable energy consuming module based on the historical usage pattern, wherein the historical usage pattern that indicates the user did not use the at least one controllable energy consuming module after an output of a motion sensor indicated a rapid increase in altitude;
changing an energy level of the at least one controllable energy consuming module used on the prediction rule in response to detecting the historical usage pattern during a second monitoring operation; and
updating the prediction rule based on a determination of whether the at least one controllable energy consuming module was used during a third monitoring operation.

33. The method of claim 32, wherein the energy level of the at least one controllable energy consuming module functioning as the transceiver module is reduced in response to detecting that the altimeter indicates a rapid increase in altitude.

34. A method comprising:
a first step for identifying a historical usage pattern by monitoring usage of at least one controllable energy consuming module during a first monitoring operation;
a second step for creating a prediction rule that predicts a future usage of the at least one controllable energy consuming module based on the historical usage pattern;
a third step for changing an energy level of the at least one controllable energy consuming module based on the prediction rule after the historical usage pattern is detected during a second monitoring operation; and
a fourth step for updating the prediction rule based on a determination of whether the at least one controllable energy consuming module was used during a third monitoring operation.

35. The method of claim 34, wherein the first step, the second step, the third step, and the fourth step are performed by a processor integrated into an electronic device.

36. A computer readable tangible medium storing instructions executable by a computer, the instructions comprising:
instructions that are executable by the computer to identify a historical usage pattern by monitoring usage of at least one controllable energy consuming module during a first monitoring operation;
instructions that are executable by the computer to create a prediction rule that predicts a future usage of the at least one controllable energy consuming module based on the historical usage pattern;
instructions that are executable by the computer to change an energy level of the at least one controllable energy consuming module based on the prediction rule after the historical usage pattern is detected during a second monitoring operation; and
instructions that are executable by the computer to update the prediction rule based on a determination of whether the at least one controllable energy consuming module was used during a third monitoring operation.

37. The computer readable tangible medium of claim 36, wherein the instructions are executable by a processor integrated into a device selected from the group consisting of a set top box, a music player, a video player, an entertainment unit, a navigation device, a communications device, a personal digital assistant (PDA), a fixed location data unit, and a computer.

38. A method comprising:
receiving design information representing at least one physical property of a semiconductor device, the semiconductor device including:
  detection logic configured to determine a historical usage pattern of at least one controllable energy consuming module;
  prediction logic configured to create a prediction rule that predicts a future usage of the at least one controllable energy consuming module based on the historical usage pattern;
  control logic configured to selectively control an energy level of the at least one controllable energy consuming module based on the prediction rule; and
  learning logic configured to update the prediction logic in response to detecting usage of the at least one controllable energy consuming module in a manner that differs from the predicted future usage;
transforming the design information to comply with a file format; and
generating a data file including the transformed design information.

39. The method of claim 38, wherein the data file includes a GDSII format.

40. A method comprising:
receiving a data file including design information corresponding to a semiconductor device, and fabricating the semiconductor device according to the design information, wherein the semiconductor device includes:
   detection logic configured to determine a historical usage pattern of at least one controllable energy consuming module;
   prediction logic configured to create a prediction rule that predicts a future usage of the at least one controllable energy consuming module based on the historical usage pattern;
   control logic configured to selectively control an energy level of the at least one controllable energy consuming module based on the prediction rule; and
   learning logic configured to update the prediction logic in response to detecting usage of the at least one controllable energy consuming module in a manner that differs from the predicted future usage.

41. The method of claim 40, wherein the data file has a GDSII format.

42. A method comprising:
   receiving design information including physical positioning information of a packaged semiconductor device on a circuit board, the packaged semiconductor device including a semiconductor structure comprising:
      detection logic configured to determine a historical usage pattern of at least one controllable energy consuming, module;
      prediction logic configured to create a prediction rule that predicts a future usage of the at least one controllable energy consuming module based on the historical usage pattern;
      control logic configured to selectively control an energy level of the at least one controllable energy consuming module based on the prediction rule; and
      learning logic configured to update the prediction logic in response to detecting usage of the at least one controllable energy consuming module in a manner that differs from the predicted future usage;
   transforming the design information to generate a data file.

43. The method of claim 42, wherein the data file has a GERBER format.

44. A method comprising:
   receiving a data file including design information including physical positioning information of a packaged semiconductor device on a circuit board; and
   manufacturing the circuit board configured to receive the packaged semiconductor device according to the design information, wherein the packaged semiconductor device comprises:
      detection logic configured to determine a historical usage pattern of at least one controllable energy consuming module;
      prediction logic configured to create a prediction rule that predicts a future usage of the at least one controllable energy consuming module based on the historical usage pattern;
      control logic configured to selectively control an energy level of the at least one controllable energy consuming module based on the prediction rule; and
      learning logic configured to update the prediction logic in response to detecting usage of the at least one controllable energy consuming module in a manner that differs from the predicted future usage.

45. The method of claim 44, wherein the data file has a GERBER format.

46. The method of claim 44, further comprising integrating the circuit board into a device selected from the group consisting of a set top box, a music player, a video player, an entertainment unit, a navigation device, a communications device, a personal digital assistant (PDA), a fixed location data unit, and a computer.

* * * * *